United States Patent
Butterbach et al.

(10) Patent No.: US 6,803,400 B1
(45) Date of Patent: Oct. 12, 2004

(54) WATER-SWELLABLE HOT-MELT-TYPE ADHESIVE

(75) Inventors: Ruediger Butterbach, Essen (DE); Ulricke Maassen, Neuss (DE); Siegfried Kopannia, Krefeld (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/646,321

(22) PCT Filed: Dec. 14, 1999

(86) PCT No.: PCT/EP99/09909

§ 371 (c)(1),
(2), (4) Date: Mar. 30, 2001

(87) PCT Pub. No.: WO00/39232

PCT Pub. Date: Jul. 6, 2000

(30) Foreign Application Priority Data

Dec. 23, 1998 (DE) .......... 198 59 728

(51) Int. Cl.[7] ............... C08J 3/00; C08K 3/20; C08L 91/06; C08F 2/16; B05D 3/00
(52) U.S. Cl. .......... 524/270; 427/372.2; 427/385.5; 524/275; 524/457; 524/460; 524/500
(58) Field of Search ............... 524/270, 275, 524/457, 460, 500; 427/372.2, 385.5

(56) References Cited

U.S. PATENT DOCUMENTS

| | | | |
|---|---|---|---|
| 3,345,320 A | 10/1967 | Uffner et al. | 260/31.6 |
| 3,972,328 A | 8/1976 | Chen | 128/156 |
| 4,231,369 A | 11/1980 | Sorensen et al. | 128/283 |
| 4,367,732 A | 1/1983 | Poulsen et al. | 128/156 |
| 4,393,080 A | 7/1983 | Pawelchak et al. | 428/355 |
| 4,548,845 A | 10/1985 | Parsons et al. | 428/40 |
| 4,551,490 A | 11/1985 | Doyle et al. | 524/22 |
| 4,590,227 A | 5/1986 | Nakamura et al. | 523/130 |
| 5,075,373 A | 12/1991 | Takemori et al. | 525/57 |
| 5,110,605 A | 5/1992 | Acharya | 424/487 |
| 5,138,685 A | 8/1992 | Arroyo et al. | 385/113 |
| 5,179,611 A | 1/1993 | Umeda et al. | 385/110 |
| 5,188,883 A | 2/1993 | Rawlyk | 428/189 |
| 5,410,629 A | 4/1995 | Arroyo | 385/109 |
| 5,715,343 A | 2/1998 | Anelli et al. | 385/100 |
| 5,721,295 A | 2/1998 | Bruggemann et al. | 524/44 |
| 5,736,595 A | 4/1998 | Gunther et al. | 524/45 |
| 5,925,461 A | 7/1999 | Fairgrieve | 428/372 |
| 6,167,179 A | 12/2000 | Weiss et al. | 385/103 |
| 6,677,394 B1 | 1/2004 | Butterbach et al. | 524/388 |

FOREIGN PATENT DOCUMENTS

| | | |
|---|---|---|
| CA | 1 289 096 | 9/1991 |
| DE | 196 52 762 | 8/1998 |
| EP | 0 189 959 | 7/1986 |
| EP | 0439277 A1 | 7/1991 |
| EP | 0 489 967 | 6/1992 |
| EP | 0685855 A1 | 12/1995 |
| EP | 0699800 A2 | 3/1996 |
| EP | 0 700 414 | 3/1996 |
| EP | 0 701 587 | 3/1996 |
| JP | 58/215334 | 12/1983 |
| JP | 02/155953 | 6/1990 |
| JP | 3176332 | 7/1991 |
| WO | WO 9 531188 | 5/1995 |
| WO | WO98/27559 | 6/1998 |

OTHER PUBLICATIONS

US 5,020,875, 6/1991, Arroyo et al. (withdrawn)
Procter & Gamble Opposition against EP–B–946949.
Eastman Product Data; Abitol® –E–45.010–E5.

*Primary Examiner*—Patrick D. Niland
(74) *Attorney, Agent, or Firm*—Stephen D. Harper

(57) ABSTRACT

Water-swellable hot-melt adhesives based on a tackifying resin, a water-dispersible EVA wax, an ethylene/acrylic ester copolymer, a water-soluble homo- or co-polymer and a super absorber polymer powder having an average particle size of less than 80 μm display a clearly improved swelling behavior in comparison with the prior art. Furthermore, the swelling agent is significantly more homogeneously distributed in the matrix. Such hot-melt adhesives are suitable for ensuring longitudinal water impermeability in modern cable structures, as water-swellable jointing compounds in the building industry in the area of building conservation and restoration. Such hot-melt adhesives are further suitable for the manufacture of absorbent textile fabrics in the personal hygiene sector.

26 Claims, No Drawings

WATER-SWELLABLE HOT-MELT-TYPE ADHESIVE

FIELD OF THE INVENTION

This invention relates to a water-swellable hot-melt adhesive and to the use of such hot-melt adhesive to manufacture cables, for sealing purposes, for general assembly applications and for bonding non-woven articles.

BACKGROUND OF THE INVENTION

Water-absorbing or water-swellable compositions are widely used for sealing purposes, for assembly applications and as binders for non-wovens in the manufacture of personal hygiene products. Water-absorbing and water-swellable compositions are used, for example, in pipeline construction to ensure longitudinal water impermeability in multi-layer pipe structures and in the building industry as jointing compounds in the area of building conservation or restoration. Cables that are laid in the ground or under water represent a further field of application. These cables have to be protected against water penetration in the event of damage to the outer jacket and at transition points and joints. Power, telecommunications and optical cables in particular are long-lived capital goods, the reliability of which has to be assured over a very long service period. In the event of damage to the external insulation and/or defective transition points, water penetrates into the interior of such cable structures, and these intrusions of water may cause substantial damage to the cables. The water may spread rapidly along the longitudinal axis of the cable, rendering unusable long sections of cable damaged in this way.

Water-swellable sealing compounds or sealing structures have been used for some time now to prevent the penetration of water into cable structures and pipeline structures as well as to form seals in building conservation. JP-A-58-215334 (1983) describes in general terms, heat-curable sealing compounds based on rubbers and a water-swellable polyurethane resin based on ethylene oxide copolymers.

JP-A-02 155 953 describes salt water-resistant water-swellable materials for seals based on vulcanisable rubbers and water-absorbing resins consisting of acrylic acid derivatives. These materials have to be vulcanised in presses at temperatures of about 160° C. for about 30 minutes.

EP-A-0 188 959 describes a multi-layer sealing strip consisting of a support made from paper, textile materials or plastics, which is coated with a layer of a water-swellable polymeric powder and a water-soluble binder and optionally also a surfactant.

U.S. Pat. No. 5,020,875 describes cable structures in which the layer designed to prevent water intrusion by swelling consists of a multi-layer laminate. This laminate consists of two support strips made from hydrophobic material, such as polyester. A water-swellable super absorber type polymer or copolymer is interlayered between these two support strips.

U.S. Pat. No. 5,188,883 describes a multi-layer composite structure consisting of a metal strip as one layer and a layer of a swellable water-blocking material, whereby the two layers and surfaces are bonded by means of an adhesive.

U.S. Pat. No. 5,179,611 describes a cable structure for a fiber optic cable having a water-absorbing element that has been applied to a support by means of a coating method. To this end, a water-absorbing composition consisting of a thermoplastic elastomer, a water-absorbing resin and a water-soluble resin is mixed, this mixture is dissolved or dispersed in a solvent and this solution or suspension is coated onto a flat substrate, such as a textile material or paper, whereupon the solvent is evaporated off by drying.

WO-A-98/27559 describes swellable hot-melt adhesives based on a water-insoluble component consisting of one or more thermoplastic polymers and one or more resins having a saponification value other than 0, together with a water-soluble or water-dispersible component and a water-swellable component belonging to the class of super absorbers. According to this publication, these are suitable for use as water-swellable hot-melt adhesives in the manufacture of water-tight structures, particularly in the manufacture of longitudinally water-tight cable structures. The components should be mixed together homogeneously, i.e. there must be no macroscopic inhomogeneities present. No mention is made of the particle size of the water-swellable components.

SUMMARY OF THE INVENTION

Although the swellable hot-melt adhesives according to the latest prior art are already characterised by great ease of use in the manufacture of longitudinally water-tight cable structures, there is a need for further improvement in the latter compositions in terms of the speed of swelling on exposure to water. An object was therefore to provide a hot-melt adhesive that is as easy to process as possible and exhibits a high and very rapid swellability on exposure to water. At the same time this adhesive should demonstrate low surface tack at room temperature.

Details of the manner by which this object is achieved according to the present invention may be found in the claims. It consists essentially of the provision of a water-swellable hot-melt adhesive containing:

- at least one tackifying resin
- at least one water-dispersible EVA wax
- at least one ethylene/acrylic acid copolymer
- at least one water-soluble homo- or co-polymer
- and at least one powdered super absorber polymer having an average particle size of less than 80 µm.

DETAILED DISCUSSION OF THE INVENTION

The tackifying resin is used in this context as a bonding agent and compatibility agent and all known tackifying resins that are used for hot-melt adhesives may be used here. Particularly suitable in this respect are the various colophony derivatives, i.e. particularly the resin esters of abietic acid and hydrogenation products thereof. These colophony derivatives are also known as colophony esters of various mono- and poly-functional alcohols. Polyterpenes and terpene phenolic resins may also be used as tackifying resin.

Water-dispersible EVA waxes are polyethylene waxes based on an ethylene/vinyl acetate copolymer having a vinyl acetate content of up to 15% and molecular weights of between 500 and about 10,000 (determined by viscometry). These specialised polyethylene waxes are characterised by the hydrophilic properties thereof, for example, they are dispersible in water.

Flexibilising ethylene copolymers, particularly ethylene/alkyl acrylate copolymers having an alkyl acrylate proportion of 15 to 40 wt. %, are suitable as hydrophobic matrix components for binding the super absorbers. The longer-chain alkyl acrylic esters are particularly suitable as comonomers in this respect, particularly the $C_4$–$C_{12}$ alkyl acrylates. These ethylene/alkyl acrylate copolymers generally exhibit a softening point of between 80 and 100° C. (ring and ball method, ASTM E 28).

A large number of known homo- or co-polymers may be used as water-soluble homo- or co-polymers, particularly polyethylene glycol, ethylene oxide/propylene oxide copolymers (either as block copolymers or as random copolymers having a predominate proportion of ethylene oxide), polyvinyl methyl ether, polyvinyl pyrrolidone, polyvinyl alcohol and copolymers of such monomers with other olefinically unsaturated monomers. These water-soluble polymers have molecular weights of between 1000 and 20,000, they may be liquid at room temperature or are preferably solid and waxy in cases where higher molecular weights are used.

Suitable powdered super absorber polymers include known homo- and co-polymers of acrylic acid or methacrylic acid ((meth)acrylic acid for short), (meth)acrylonitrile, (meth)acrylamide, vinyl acetate, vinyl pyrrolidone, maleic acid, maleic anhydride, itaconic acid, itaconic anhydride, vinyl sulfonic acid or hydroxyalkyl esters of such acids, 0 to 95 wt. % of the acid groups being neutralised with alkali or ammonium groups and these polymers/copolymers are crosslinked by means of polyfunctional compounds. Such polymers are known, for example, from EP-A-0 700 414 or EP-A-0 701 587. The latter publication discloses that the polymer powders should have a particle size of between 90 and 630 $\mu$m. According to the present invention, however, the average particle size of the super absorber polymer powders is less than 80 $\mu$m. Particle sizes of between 60 and 2 $\mu$m are particularly preferred for the super absorber polymer powders.

Graft copolymers of starch or cellulose with the above comonomers are also known to be suitable as super absorbers, albeit again with the precondition that the particle size of the super absorber polymer powder is less than 80 $\mu$m.

The hot-melt adhesives according to the present invention may further contain known commercial stabilisers that guarantee the temperature stability of the formulations; these include, for example, conventional antioxidants based on sterically hindered phenols.

Particularly preferred swellable hot-melt adhesives contain the essential components in the following quantities:

10 to 25% tackifying resin 20 to 40% water-dispersible EVA wax 5 to 25 wt. % flexibilising ethylene/acrylic ester copolymer 15 to 35 wt. % water-soluble homo- or co-polymer 20 to 40 wt. % super absorber polymer powder.

The water-swellable hot-melt adhesives according to the present invention are suitable, for example, for coating metal foils or glass fiber-reinforced plastics reinforcing elements in cable construction. One example of a particularly preferred application is the direct coating of the central reinforcing element in optical cables. This central element may be coated with the version of the adhesive that does not exhibit surface tack and then rolled and placed in temporary storage. In conventional optical cables the individual optical fibers are arranged concentrically around this central element. After reactivation of the non-surface-tacky version of the adhesive on the central element, these optical fibers may be bonded directly onto the central element prior to undergoing additional fabrication steps. The outer side of the plastics tubes that contain the optical fiber(s) may optionally also be coated with the hot-melt adhesive according to the present invention. Use of the hot-melt adhesives according to the present invention may avoid the need for sheathing the optical fibers with a water-swellable multi-layer adhesive tape or a multi-layer flowing material or for longitudinal waterproofing of the void between the central element and the tubes with a grease (petroleum jelly), as is necessary according to the present prior art. The voids that are a structural feature of cable construction may be ignored, since in the event of water penetration the water-swellable hot-melt adhesive completely fills these voids by virtue of the swelling process, thereby ensuring a reliable longitudinal water seal. This type of construction provides a simplified joining method, the option of working without grease and a significant weight saving in cable construction. A higher production speed may also be achieved in comparison to the processing of laminar flow.

In addition to the above fields of application in the manufacture of longitudinally water-tight optical cables, the water-swellable hot-melt adhesives according to the present invention are also suitable for ensuring the longitudinal water impermeability of various types of power and telecommunications cables based on copper conductors.

The water-swellable hot-melt adhesives according to the present invention are further suitable for use as jointing compounds in the area of building conservation or restoration to form a seal against the penetration of moisture or water into buildings. A further field of application is pipeline construction, for example to ensure the longitudinal water impermeability of multi-layer coaxial pipe structures. The hot-melt adhesives according to the present invention are also suitable for use as binders for non-woven products in the personal hygiene sector, such as nappies, incontinence pads, incontinence products, sanitary towels, panty liners or mattress covers. Use of the hot-melt adhesives according to the present invention is also conceivable for recyclable bonded joints, where bonds need to be released again subsequently (following the action of water); this is very greatly encouraged by swelling in water.

The water-swellable hot-melt adhesives may be manufactured as follows: tackifying resin, for example resin ester, EVA wax and ethylene/acrylic ester copolymer are melted at 110 to 160° C. and homogenised. The water-soluble homo- or co-polymer(s) is/are then added and homogenised. Finally the powdered super absorber polymer powder is incorporated and homogenised. The homogeneous melt is then poured into the corresponding packing units and cooled at room temperature.

The compositions according to the present invention are illustrated in greater detail by means of the following Examples, which represent only a limited selection and are in no way intended to restrict the scope of the present invention.

Method of Determining the Water Absorption of Water-swellable Hot-melt Adhesives Using the "Tea Bag Test" Method Preparation of Samples A 1 mm thick sheet, as free from bubbles as possible, is produced from a homogeneously manufactured adhesive sample in a heated press at an appropriate temperature. Two square test pieces whose edges measure 5×5 cm are cut from it to provide test pieces having a surface area of 52 cm².

The test pieces should be as fresh and as free from water as possible. The test pieces are optionally dried overnight in a drying cabinet or desiccator.

The mass of the test pieces $m_t$ is determined. Each test piece is placed in a commercial tea filter made from filter paper. This is attached to a commercial plastics holder (the Teekanne range of tea filters and holders, for example, is particularly suitable). The mass of the filter and holder $m_{FH}$ is determined.

Performing the Measurement

The sample is immersed in a 600 ml beaker filled with the desired test liquid. The test liquid may be demineralised water, tap water, salt water or another aqueous solution. After exactly one minute, the support is removed from the liquid and allowed to drip into a larger beaker for 5 minutes without being touched. The weight $m_{tot}$ of the filter, holder, sample and bound water is then determined and the water absorption of the test piece calculated as follows:

Water absorption $m_w[\text{g water}] = m_{tot} - (m_t + m_{FH})$

The swelling capacity of the product to be tested may be given by relating the absorbed quantity of water to the surface area and mass of the sample:

Swelling capacity $[\text{g}/(\text{g} \times \text{cm}^2)] = m_w/(m_t \times 52)$ For comparative purposes this value is quoted accurate to three decimal places.

Following the 5 minute dripping time and determination of the weight, the sample is suspended in the test liquid for a further test period and the above procedure is repeated.

| Example | 1 | 2 | Comp. 1 | Comp. 2 |
|---|---|---|---|---|
| Tackifying resin[1] | 19.0 | 10.0 | 10.0 | 19.0 |
| Ethylene/acrylic ester copolymer[2] | 15.0 | 10.0 | 10.0 | 15.0 |
| Water-soluble polymer[3] | 20.0 | 22.5 | 22.5 | 20.0 |
| EVA wax[4] | 20.8 | 32.3 | 32.3 | 20.8 |
| IRGANOX 1010 antioxidant | 0.2 | 0.2 | 0.2 | 0.2 |
| Super absorber (>100 µm) | | | 25.0 | 25.0 |
| Super absorber (60–2 µm) | 25.0 | 25.0 | | |
| Control total | 100.0 | 100.0 | 100.0 | 100.0 |
| Softening point ° C. | 94.6 | 96.8 | 94.5 | 92.4 |
| Viscosity 140° C. [mPa · s] (n = 1 rpm) | 56000 | 39750 | 44250 | 58750 |
| Viscosity 160° C. [mPa · s] (n = 2.5 rpm) | 20300 | 13700 | 28900 | 35000 |
| Homogeneity of the swelling agent (15 = homog; 0 = inhomog) | 15 | 15 | 8 | 8 |
| Swelling behavior - tea bag test: water absorption (1 min) [g/(g × cm²)] | 0.047 | 0.031 | 0.030 | 0.023 |
| Swelling behavior - tea bag test: water absorption (10 min) [g/(g × cm²)] | 0.346 | 0.416 | 0.264 | 0.224 |

[1]Colophony pentaerythritol ester
[2]Ethylene butyl acrylate copolymer m.p. 94° C. (ring & ball)
[3]Polyethylene glycol, MW 12000
[4]EVA content about 9%, MW about 6500

In relation both to the homogeneous distribution of the swelling agent and to the swelling behavior in the tea bag test, after short-term water absorption and after longer-term water absorption, the hot-melt adhesives according to the present invention display significantly better properties than the comparative examples containing the coarser super absorber polymer powder.

What is claimed is:

1. A water-swellable hot-melt adhesive comprising:
   (a) at least one tackifying resin
   (b) at least one water-dispersible EVA wax
   (c) at least one ethylene/acrylic ester copolymer
   (d) at least one water-soluble homo- or co-polymer
   (e) at least one powdered super absorber polymer having an average particle size of less than 80 µm.

2. The water-swellable hot-melt adhesive of claim 1 wherein the average particle size of the powdered super absorber polymer (e) is between 60 and 2 µm.

3. The water-swellable hot-melt adhesive of claim 1 comprising at least one tackifying resin selected from the group consisting of colophony derivatives, polyterpenes, and terpene phenolic resins.

4. The water-swellable hot-melt adhesive of claim 1 comprising at least one water-soluble homo- or co-polymer selected from the group consisting of polyethylene glycols, ethylene oxide/propylene oxide copolymers, polyvinyl methyl ethers, polyvinyl pyrrolidones, polyvinyl alcohols, and copolymers of at least one monomer selected from the group consisting of vinyl methyl ether, vinyl pyrrolidone, and vinyl alcohol and at least one other olefinically unsaturated monomer.

5. The water-swellable hot-melt adhesive of claim 1 comprising at least one powdered super absorber polymer selected from the group consisting of homo- and co-polymers of (meth)acrylic acid, (meth)acrylonitrile, (meth)acrylamide, vinyl acetate, vinyl pyrrolidone, maleic acid, maleic anhydride, itaconic acid, itaconic anhydride, vinyl sulfonic acid, and hydroxyalkyl esters thereof, wherein 0 to 95 wt % of the acid groups are neutralized and said homo- and co-polymers are crosslinked by means of polyfunctional compounds.

6. The water-swellable hot-melt adhesive of claim 1 comprising at least one ethylene/acrylic acid co-polymer which is a co-polymer of ethylene and at least $C_4$–$C_{12}$ alkyl acrylate.

7. The water-swellable hot-melt adhesive of claim 1 comprising:
   20 to 40 wt % water-dispersible EVA wax (b);
   5 to 25 wt % ethylene/acrylic ester copolymer (c); and
   20 to 40 wt % super absorber polymer (e).

8. A cable selected from the group consisting of power cables, telecommunications cables, and optical cables comprising the water-swellable hot-melt adhesive of claim 1.

9. A building comprising at least one joint which is sealed with the water-swellable hot-melt adhesive of claim 1.

10. A personal hygiene product comprising textile fabrics and a binder comprised of the water-swellable hot-melt adhesive of claim 1.

11. A multi-layer pipe structure comprising the water-swellable hot-melt adhesive of claim 1.

12. A method of improving longitudinal water impermeability in a cable structure, said method comprising using the water-swellable hot-melt adhesive of claim 1 in constructing said cable structure.

13. A method of sealing a joint in a building comprising filling said joint with the water-swellable hot-melt adhesive of claim 1.

14. A method of improving the longitudinal water impermeability of a multi-layer pipe structure, said method comprising using the water-swellable hot-melt adhesive of claim 1 in constructing said multi-layer pipe structure.

15. A method of binding a first textile fabric to a second textile fabric comprising using the water-swellable hot-melt adhesive of claim 1 to bind said first textile fabric to said second textile fabric.

16. A method of forming a recyclable bonded joint between a first substrate and a second substrate, said method comprising using the water-swellable hot-melt adhesive of claim 1 to bond said first substrate to said second substrate.

17. A water-swellable hot-melt adhesive comprising:

(a) at least one tackifying resin selected from the group consisting of colophony derivatives, polyterpenes, and terpene phenolic resins;

(b) at least one water-dispersible EVA wax;

(c) at least one ethylene/acrylic ester copolymer which is a copolymer of ethylene and at least one $C_4$–$C_{12}$ alkyl acrylate;

(d) at least one water-soluble homo- or co-polymer selected from the group consisting of polyethylene glycols, ethylene oxide/propylene oxide copolymers, polyvinyl methyl ethers, polyvinyl pyrrolidones, polyvinyl alcohols, and copolymers of at least one monomer selected from the group consisting of vinyl methyl ether, vinyl pyrrolidone, and vinyl alcohol and at least one other olefinically unsaturated monomer; and (e) at least one powdered super absorber polymer having an average particle size of between 60 and 2 $\mu$m and selected from the group consisting of homo- and co-polymers of (meth)acrylic acid, (meth)acrylonitrile, (meth)acrylamide, vinyl acetate, vinyl pyrrolidone, maleic acid, maleic anhydride, itaconic acid, itaconic anhydride, vinyl sulfonic acid, and hydroxyalkyl esters thereof, wherein 0 to 95 wt % of the acid groups are neutralized and said homo- and co-polymers are crosslinked by means of polyfunctional compounds.

18. The water-swellable hot-melt adhesive of claim 17 comprising at least one tackifying resin which is a colophony pentaerythritol ester.

19. The water-swellable hot-melt adhesive of claim 17 comprising at least one co-polymer of ethylene and butyl acrylate.

20. The water-swellable hot-melt adhesive of claim 17 comprising at least one polyethylene glycol.

21. The water-swellable hot-melt adhesive of claim 17 comprising;

20 to 40 wt % water-dispersible EVA wax (b);

5 to 25 wt % ethylene/acrylic ester copolymer (c); and 20 to 40 wt % super absorber polymer (e).

22. An optical cable comprising the water-swellable hot-melt adhesive of claim 17.

23. An optical cable comprising a central reinforcing element and optical fibers bonded to the central reinforcing element by means of a coating of the water-swellable hot-melt adhesive of claim 17.

24. A method of constructing a cable structure comprised of a central reinforcing element and optical fibers, said method comprising bonding the optical fibers and the central reinforcing element using the water-swellable hot-melt adhesive of claim 17.

25. The method of claim 24 wherein the central reinforcing element is coated with the water-swellable hot-melt adhesive before bonding the optical fibers to the central reinforcing element.

26. The method of claim 24 wherein the optical fibers are contained in plastic tubes which are coated with the water-swellable hot-melt adhesive.

\* \* \* \* \*